United States Patent [19]
Crooke

[11] 3,866,223
[45] Feb. 11, 1975

[54] MULTIPLICATIVE SIGNAL PROCESSOR FOR TARGET DETECTION SYSTEMS WITH SEQUENTIAL DOPPLER SEARCH

[75] Inventor: Arthur W. Crooke, Concord, Mass.

[73] Assignee: Sperry Rand Corporation, New York, N.Y.

[22] Filed: Feb. 1, 1972

[21] Appl. No.: 224,369

[52] U.S. Cl.................... 343/17.2 PC, 343/100 CL
[51] Int. Cl........................... G01s 7/28, G01s 9/02
[58] Field of Search................ 343/17.2 PC, 100 CL

[56] References Cited
UNITED STATES PATENTS

| | | | |
|---|---|---|---|
| 3,145,341 | 8/1964 | Andrew......................... | 343/100 CL |
| 3,208,065 | 9/1965 | Gutleber et al............... | 343/100 CL |
| 3,261,969 | 7/1966 | Routh.......................... | 343/17.2 PC |
| 3,337,870 | 8/1967 | Allen et al................. | 343/100 CL X |
| 3,374,478 | 3/1968 | Blau............................ | 343/100 CL |
| 3,500,403 | 3/1970 | Fuller......................... | 343/17.2 R X |

Primary Examiner—Malcolm F. Hubler
Attorney, Agent, or Firm—Howard P. Terry; Albert B. Cooper

[57] ABSTRACT

Apparatus for processing return signals in target detection systems that transmit composite signals comprising components that are delayed by different amounts with respect to each other in accordance with the doppler frequency shifts of the targets. The signal processor comprises matched filters responsive to return signals reflected from targets and matched to the respective components of the composite signals. The output of one of the matched filters occurring during a predetermined time interval is stored and applied in compressed time as an input to a multiplier. The other input to the multiplier is provided by the output from the other matched filter. The multiplier provides an output signal substantially free of range and doppler ambiguities conveniently suited to a range-doppler display format based on a sequential search of the doppler frequencies of interest.

7 Claims, 5 Drawing Figures

MULTIPLICATIVE SIGNAL PROCESSOR FOR TARGET DETECTION SYSTEMS WITH SEQUENTIAL DOPPLER SEARCH

The invention herein described was made in the course of or under a contract or sub-contract thereunder with the Department of the Navy.

BACKGROUND OF THE INVENTION

1. Field of the Invention

The invention pertains to apparatus for processing return signals in target detection systems such as radar and sonar systems particularly with regard to multiplicative signal processors.

2. Description of the Prior Art

U.S. Pat. application Ser. No. 125,420 filed Mar. 17, 1971, now U.S. Pat. No. 3,808,594, entitled "Multiplicative Signal Processor For Target Detection Systems" in the names of C. E. Cook and S. E. Bogotch and assigned to the assignee of the present invention as well as U.S. Pat. application Ser. No. 807,689, now U.S. Pat. No. 3,631,490 filed Mar. 17, 1969, entitled "Signal Processor For Reducing Clutter and Eliminating Range Ambiguities in Target Detection Systems" in the name of C. A. Palmieri and assigned to the assignee of the present invention, disclose multiplicative signal processors for use in target detection systems. In these devices, a parallel search of the doppler frequencies of interest is performed necessitating a plurality of matched filtering channels, each matched to a different doppler frequency resulting in an exceedingly complex and, hence, expensive system.

SUMMARY OF THE INVENTION

The present invention provides an multiplicative processor and an associated display implemented to perform a sequential search of the doppler frequencies of interest resulting in a significant reduction in complexity compared to the devices discussed above. The invention provides a multiplicative processor for processing return signals in target detection systems that transmit composite signals comprising components that are differently delayed with respect to each other in accordance with the doppler shift of the targets. The multiplicative processor comprises matched filters responsive to the return signals reflected from the targets and matched to the respective components of the composite signals. The output of one of the matched filters is stored and applied in time compressed fashion to one input of a multiplier. The other input of the multiplier receives the output from the other matched filter. The multiplier provides an output signal substantially free of range and doppler ambiguities which output signal may be applied to a range-doppler display particularly suited to the sequential search of the doppler frequencies.

DESCRIPTION OF THE PREFERRED EMBODIMENT

The principles of the present invention are applicable to a wide variety of target detection systems wherein a composite waveform is transmitted having waveform components that are delayed by different amounts with respect to each other by the doppler shifts of the targets. Such a waveform is exemplified by the v-fm waveform described in detail in said Ser. No. 125,420, now U.S. Pat. No. 3,808,594, and in the textbook "Radar Signals" by C. E. Cook and M. Bernfeld, published in 1967 by the Academic Press of New York. For purposes of description, the present invention will be explained in terms of a sonar target detection system where a V-shaped doppler invariant FM waveform is transmitted. For brevity, the term V-shaped doppler invariant FM will be hereinafter referred to as VDIFM.

Figure 1:
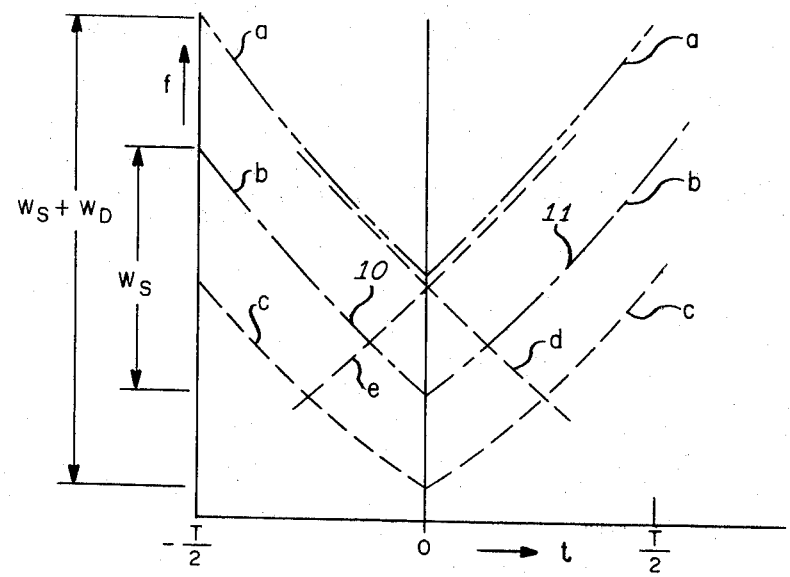
FIG. 1 is a graph of frequency versus time schematically illustrating transmitted and received doppler invariant v-fm waveforms as well as the doppler invariant comparison replica waveforms used in practicing the preferred embodiment of the invention.

Referring to FIG. 1, a graph of frequency versus time schematically illustrates the transmitted VDIFM waveform as curve $b$. The waveform $b$ comprises a downsweep 10 and an upsweep 11. The VDIFM waveform is of a well known type useful in sonar systems where the carrier frequency is first swept in one direction in accordance with the doppler invariant FM function and then swept in the other direction in accordance therewith. As is well known, this function is of such a character that doppler shifts imparted to the waveform by moving targets do not significantly alter the shape of the waveform. In the example illustrated in FIG. 1, the carrier frequency is first swept downwardly through a frequency bandwidth of $W_S$ in accordance with the downsweep 10 of curve $b$ and then upwardly through the bandwidth $W_S$ in accordance with the upsweep 11 thereof to provide a transmitted waveform of duration T. As is well known in accordance with the doppler effect, when the transmitted waveform $b$ is reflected from a target having a velocity component directed toward the receiver, the frequencies of the echo return are shifted upwardly with respect to the transmitted waveform $b$. Conversely, when the waveform $b$ is reflected from a target having a velocity component directed away from the receiver, the frequencies of the echo return are shifted downwardly with respect to the transmitted signal $b$. Curve a of FIG. 1, therefore, is representative of an echo return from a maximum up doppler target and curve $c$ is representative of an echo return from a maximum down doppler target covering a doppler frequency band of $W_D$. It will be appreciated that the curve $b$, as well as being representative of the transmitted signal, is also representative of an echo return from a target having zero radial velocity with respect to the receiver. It will be appreciated in FIG. 1 that since the curve $b$ is representative of the transmitted signal as well as the echo return from a zero doppler target, the curves $a$, $b$ and $c$ are representative of point targets with three different velocities relative to the receiver at a particular range with respect to the receiver with the signal round trip delay deleted from the diagram.

Curve d of FIG. 1 is representative of a replica of the downsweep portion 10 of the transmitted signal b and curve e is representative of the upsweep portion 11 thereof. As is well known in correlation matched filter receiver theory, it is desirable to obtain the cross-correlation function between the echo returns and stored replicas thereof. When transmitting a VDIFM waveform, the comparisons may be made between the echo returns and a stored replica of the transmitted signal such as the waveform replicas d and e of FIG. 1.

Figure 2:
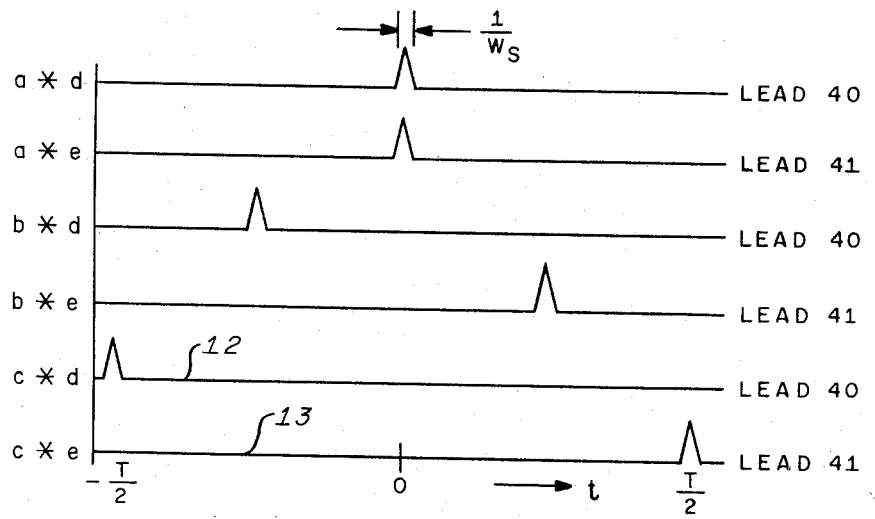
FIG. 2 is a cross-correlation function diagram for the waveforms of FIG. 1.

Referring to FIG. 2, the cross-correlation functions of the echo returns a, b and c (FIG. 1) with the waveform replicas d and e, are illustrated. The time $t = 0$ of FIG. 2 corresponds to the relative timing of the signals a, b and c with respect to the replicas d and e as illustrated in FIG. 1. For purposes of explanation, consider the echo returns a, b and c of FIG. 1 as moving from right to left across the plane of FIG. 1 and the waveform replicas d and e as stationary thereon. Therefore, it is appreciated that at T/2 seconds prior to the instant in time illustrated in FIG. 1, the downsweep of the echo return c will cross-correlate with the downsweep replica d thereby providing a cross-correlation signal at −T/2 as illustrated by signal 12 of FIG. 2. In a similar manner at a time T/2 subsequent to the instant in time illustrated in FIG. 1, the upsweep of the waveform c cross-correlates with the upsweep replica e providing a cross-correlation signal as illustrated by signal 13 of FIG. 2. In a similar manner, the down and the upsweep portions of the echo return b provide cross-correlation signals with respect to the downsweep replica d and the upsweep replica e at −T/4 and +T/4, respectively, as illustrated in FIG. 2. Similarly, the downsweep and the upsweep components of the echo return a provide their cross-correlation signals with respect to the waveform replicas at $t = 0$ as illustrated in FIG. 2.

Thus, the curves of FIG. 2 represent the outputs of a pair of matched filters matched to the two halves of the VDIFM waveform for point targets with three different velocities relative to the receiver. Therefore, the cross-correlation outputs for the two halves of the VDIFM waveform reflected from a maximum up doppler target, a zero doppler target and a maximum down doppler target would have time separations of 0, T/2 and T, respectively. It will, of course, be appreciated that targets having doppler velocities intermediate the maximum up and down values, will provide time separations between the cross-correlation outputs of the two halves of the VDIFM waveform reflected therefrom of values intermediate 0 and T corresponding to their radial velocities with respect to the receiver.

Figure 3:
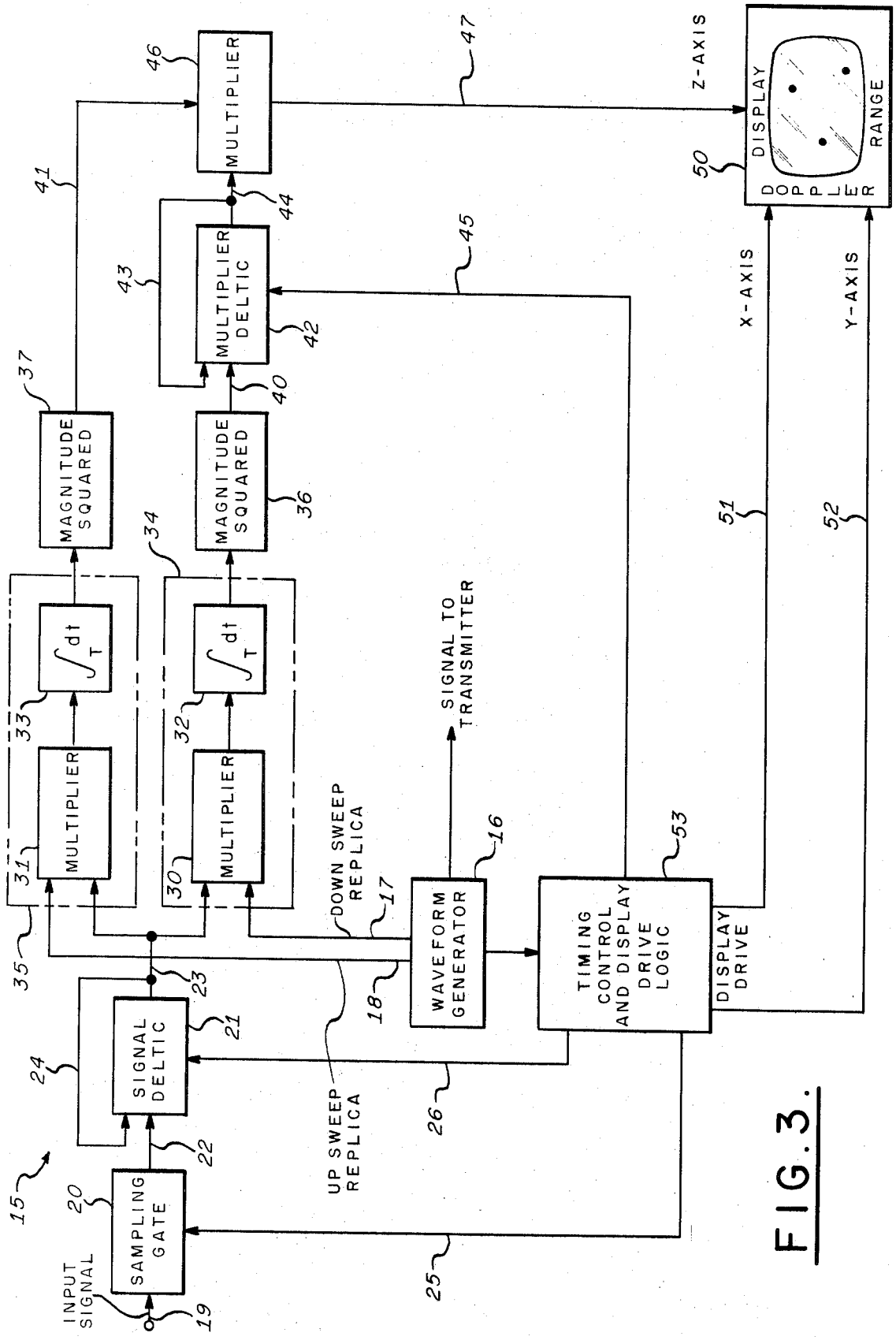
FIG. 3 is a schematic block diagram of a multiplicative processor instrumented in accordance with the principles of the present invention.

Referring now to FIG. 3, a multiplicative processor 15 that may operate with the waveforms depicted in FIGS. 1 and 2, is illustrated. A waveform generator 16 provides the VDIFM waveform b of FIG. 1 to the transmitter of the system. The waveform genertor 16 also provides the downsweep replica waveform d and the upsweep replica waveform e of FIG. 1 on leads 17 and 18, respectively. The waveform generator 16 is a conventional circuit, numerous examples thereof being well known in the art. Specifically the waveform generator 16 may be constructed in accordance with the teachings of U.S. Pat. application Ser. No. 1,090, now U.S. Pat. No. 3,633,017 filed Jan. 7, 1970, entitled "A Digital Waveform Generator" by A. W. Crooke and M. E. Hanna, Jr., and assigned to the assignee of the present application.

The echo returns of the transmitted signal are applied via the system receiver (not shown) to a terminal 19 which in turn provides the input signal to a sampling gate 20. The gate 20 samples the input signal at a rate at least equal to the Nyquist rate for reasons well understood in the information theory discipline which will not be discussed here for brevity. The sampling gate 20 applies the sampled input signal to a signal DELTIC 21 via a lead 22. The term DELTIC is an acronym for delay line time compressor and is a type of device well known in the art. Briefly, the deltic 21 stores the sequentially occurring samples from the lead 22 until a sampled input signal record of length T is stored therein. When the deltic 21 accepts a new input sample from the lead 22, it discards the oldest sample in its storage thus maintaining the latest T seconds of sampled input signal therein. Between the application of samples on the lead 22, the deltic 21 is designed to read out, on a lead 23, the entire signal record stored therein. The signal read out on the lead 23 is recirculated back into the deltic 21 via a recirculation path 24. Therefore, between the samples on the lead 22, the entire contents of the deltic 21 is circulated therethrough, the record returning to its original position within the deltic 21 prior to the application of the next sample. Thus, time compression of the input signal is effected at, for example, a speed-up factor of $TW_s$. Timing signals for controlling the operations of the sampling gate 20 and the signal deltic 21 are provided in a well known manner on leads 25 and 26, respectively.

The time compressed input signal on the lead 23 is applied as an input to a multiplier 30 and as an input to a multiplier 31. The second inputs to the multipliers 30 and 31 are provided by the previously described downsweep and upsweep replica signals on the leads 17 and 18, respectively. The downsweep and upsweep replicas are provided from the waveform generator 16 at a rate equal to the rate of the time compressed signal on the lead 23. The timing of the system is such that the downsweep and upsweep replica signals are applied to the multipliers 30 and 31, respectively, while the signal deltic 21 is undergoing a recirculation of its stored input signal. The waveform replicas are repetitively applied once for each recirculation of the deltic 21. The products from the multipliers 30 and 31 of the time compressed input signal and the waveform replicas are applied to conventional integrating circuits 32 and 33 respectively. The circuits 32 and 33 integrate the products from the multipliers 30 and 31, respectively, over the interval T which is representative of one recirculation of the deltic 21.

It will be appreciated that the multiplier 30 and the integrator 32 provide the cross-correlation function between the downsweep replica on the lead 17 and the time compressed input signal on the lead 23. In a similar manner, the multiplier 31 and the integrator 33 provide the cross-correlation function of the upsweep replica on the lead 18 with the time compressed input signal on the lead 23. Thus, in accordance with correlation theory, the multiplier 30 and the integrator 32 may be considered as a matched filter 34 matched to the downsweep replica and the multiplier 31 with the integrator 33 may be considered as a matched filter 35 matched to the upsweep replica. In a similar manner, each of the matched filters 34 and 35 together with the signal deltic 21 may be considered as conventional deltic correlators with respect to the downsweep and upsweep replicas respectively.

The outputs of the integrators 32 and 33 are applied as inputs to squared magnitude circuits 36 and 37, respectively. The squared magnitude circuits 36 and 37, respectively. The squared magnitude circuits 36 and 37 are conventional circuits for providing the square of the absolute magnitude of the integrals from the integrators 32 and 33, respectively. Thus, the magnitude squared circuits 36 and 37 provide samples of the respective outputs of the matched filters 34 and 35 on leads 40 and 41, respectively. The magnitude squared circuit 36 provides one sample of the matched filter 34 for each recirculation of the deltic 21 and the corresponding integration over the interval T by the integrator 32. Similarly, the magnitude squared circuit 37 provides one output of the matched filter 35 for each recirculation of the deltic 21 and the corresponding integration over the interval T by the integrator 33. In the present embodiment, these samples are provided on the leads 40 and 41 at a rate equal to the transmitted signal bandwidth $W_S$. Thus, it is appreciated that the matched filter samples appearing on the leads 40 and 41 occur as a result of the cross-correlation between the echo returns at the terminal 19 and the downsweep and upsweep replicas on the leads 17 and 18, respectively, which matched filter outputs are illustrated in FIG. 2 as previously discussed.

The matched filter samples on the lead 40 are applied to a multiplier deltic 42. The multiplier deltic 42 is configured in a similar manner to that described above with respect to the signal deltic 21 and includes a recirculation path 43. The multiplier deltic 42 includes storage for T seconds of signal on the lead 40. As previously described, for every recirculation of the signal deltic 21, matched filter samples are provided on the leads 40 and 41. The matched filter sample so provided on the lead 40 is stored in the multiplier deltic 42 which thereupon discards the oldest matched filter sample stored therein. For every recirculation of the signal deltic 21, the multiplier deltic is also recirculated providing on a lead 44 a time compressed version of the matched filter on the lead 40 that had occurred during the latest T second interval. The timing and control signals required to operate the deltic 42 are provided on a lead 45 in a conventional manner.

It will be appreciated that although the time consumption and storage function for the outputs of the matched filter 34 is explained in terms of the deltic 42, other instrumentations known in the art are possible. For example, the signal on the lead 40 may be applied to a tapped delay line whose tap outputs are applied via a tap scanner to the lead 44.

The time compressed matched filter samples on the lead 44 and the matched filter samples on the lead 41 are applied as inputs respectively to a multiplier 46. The multiplier 46 therefore provides on a lead 47 the product of each sample from the matched filter 35 on the lead 41 with all of the samples from the matched filter 34 on the lead 44 for the previous T seconds. A peak multiplicative processor output occurs on the lead 47 in coincidence with a matched filter peak output on the lead 41 and a delayed matched filter peak output on the lead 44 where the delay is determined by the time of occurrrence of the peak during the recirculation of the multiplier deltic 42. As previously described with respect to FIGS. 1 and 2, the time of occurrence of this peak output on the lead 47 is directly related to the doppler frequency shift of the target.

The operation of the multiplicative processor 15 permits a convenient range-doppler cathode ray tube display 50 to be instrumented by applying the multiplicative processor output on the lead 47 to the Z-axis of the display 50 as an intensity modulating signal. The X-axis and Y-axis signals for the display are provided on leads 51 and 52, respectively, which signals scan the cathode ray tube beam in accordance with a raster illustrated in FIG. 4 to provide the desired display format.

Figure 4:
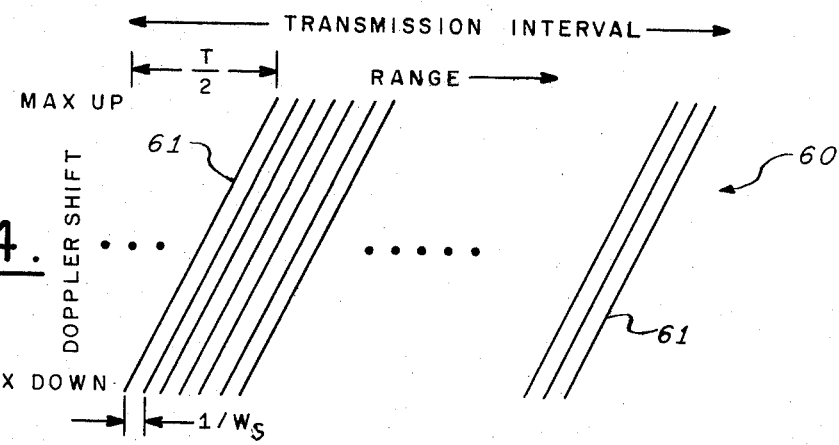
FIG. 4 is a diagram illustrating a raster scan useful in instrumenting a range-doppler display in accordance with the invention.

Referring not to FIG. 4, a raster 60 suitable for scanning the beam of the display 50 (FIG. 3) is illustrated. Each vertical scan 61 is generated to coincide with the recirculation of the multiplier deltic 42 (FIG. 3) and hence one vertical scan 61 is generated for each of the output samples from the matched filter 35. Accordingly, the vertical position of the cathode ray tube display beam corresponds to the relative position of the current sample in the multiplier deltic 42 and therefore corresponds to the relative delay between the matched filter sample on the lead 44 with respect to that on the lead 41. Thus the vertical position of the display beam corresponds to target doppler as required. The time of occurrence of the processor peak output on the lead 47 is coincident with that of the upsweep matched filter 35 which varies, relative to the arrival time of the signal, with the target doppler. The effect of this variation is compensated in the display 50 (FIG. 3) by skewing the raster 60 by the time T/2 as illustrated.

Referring again to FIG. 3, it will be appreciated that the various signals required to control the timing of the components of the multiplicative processor 15 as described above, as well as to generate the raster for the display 50 as provided on the leads 25, 26, 45, 51 and 52 are all conventional signals and may be generated by conventional timing control and display drive logic circuits 53 in a manner well understood in the art. Further description of these conventional signals and circuits is omitted for brevity.

It will be appreciated that the VDIFM waveform described above was only exemplary, a wide variety of other waveforms being possible in practicing the invention. For example, segmented linear FM waveforms may also be utilized. Multi-segment waveforms such as doppler invariant as well as linear m-fm waveforms may also be employed. Such waveforms are discussed in said Ser. No. 125,420. Generally, any composite waveform may be transmitted in the system of the present invention where the components thereof are delayed by different amounts in accordance with the doppler velocities of the targets. Furthermore, it will be appreciated that the timing illustrated in FIG. 1 of the sweep replicas with respect to the echo returns was merely illustrative, many other timing configurations being possible in practicing the invention. For example, instead of having the replicas d and e intersect at zero time in the form of an "X", the replicas may just as well intersect in the form of a "V" with the corresponding changes to the timing and storage of FIG. 3 and the skew of the raster 60 of FIG. 4. For example, with the replicas d and e in the form of a "V" coincident with the waveform b of FIG. 1, the waveforms b*d and b*e of FIG. 2 will be coincident in time necessitating delays in both channels of the processor of FIG. 3.

It will also be appreciated that matched filtering means other than those described with respect to FIG.

3 may be utilized in instrumenting the invention. For example, surface wave filters may be used that are matched to the segments of the transmitted waveform that may replace the components 20, 21, 34 and 35 of FIG. 3. Pulse compression filters of the type discussed in said Ser. No. 125,420 may also be utilized. Generally, any signal enhancing means matched to the components of the transmitted composite waveform may be utilized in practicing the invention.

It will be appreciated that the components of FIG. 3 are schematically representative of a wide variety of components that might be utilized to embody the present invention. For example, an economical embodiment of the invention may be conveniently realized by utilizing the digital waveform generator of said U.S. Pat. No. 3,633,017 as part thereof. Such an embodiment is illustrated in FIG. 5.

Figure 5:
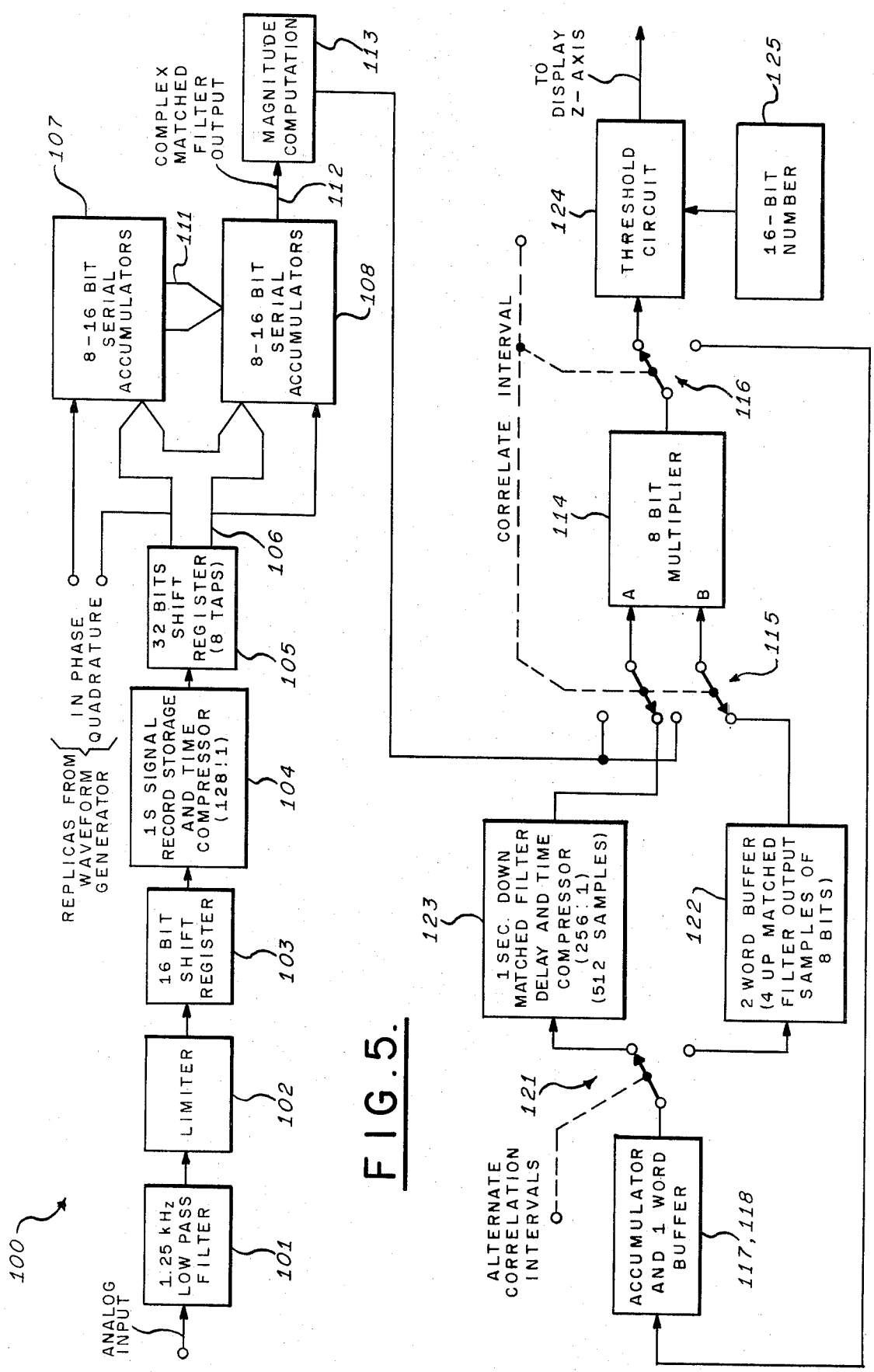
FIG. 5 is a schematic block diagram illustrating a particular embodiment instrumented in accordance with the principles of the invention.

Referring now to FIG. 5, a specific multiplicative processor 100 is depicted. For purposes of explanation, the transmitted signal is assumed to be a VDIFM waveform centered at 800 hertz with a bandwidth of 0 to 1.25 kilohertz. The target echo return signals are applied to a low pass filter 101 having a cutoff frequency of 1.25 kilohertz to eliminate noise and other unwanted signals of frequencies above the passband of interest. The filtered echo return signals are applied to a limiter wherein the amplitude values of the analog echo return signals are quantized to plus or minus 1. For example, the limiter 102 may comprise a high gain clipper such that when the analog input signal is greater than 0, the clipped output is +1 and when the analog input signal is less than 0, the clipped output is −1. Thus the hard limiter 102 converts the analog input signal to a binarily quantized signal having logic levels of binary ZERO and binary ONE, representative of the plus and minus 1 levels, respectively.

The quantized input signal is applied as an input to a 16-bit shift register 103 into which the signals are shifted at a rate of $2^{12}$ bits per second by a clock, not shown for simplicity. Thus the quantized input signal is sampled at a rate of 4,096 hertz, which in accordance with the Nyquist theorem, preserves the information content of the input signal in the sampling. The samples of the input signal are packed 16 bits to a word by the shift register 103 and thereafter loaded into a reserved 256-word block 104 of the core memory of the waveform generator of said U.S. Pat. No. 3,633,017 at a rate of $2^8$ words per second. The sequentially occurring 16-bit words from the shift register 103 are stored at sequential locations of the 256-word memory block 104 under control of a conventional address counter, not shown for simplicity. The address counter is adapted to count modulo 256 and is updated by one count for each word stored in the memory block 104. Thus, after a word is stored at the 256$^{th}$ memory location, the next occurring word is loaded into the first memory location replacing the oldest word stored therein. Thus it is appreciated that at the rates given above, a total signal record of one second may be stored in the memory block 104 with the oldest 16-bit word therein being replaced by the latest occurring 16-bit word. The memory location at which the latest occurring word is stored sequentially proceeds through the 256-word memory block 104 in modulo 256 fashion in synchronism with the address counter which is updated by unity for each entry of a word into memory.

After entry of each new word into the memory block 104, the entire block of stored words may be read out in compressed time beginning at the oldest word and ending at the latest word stored therein. This may be accomplished by utilizing another modulo 256 address counter (not shown for simplicity) adapted to count at a clock rate of $2^{15}$ counts per second. Prior to the rapid readout, this fast address counter may be pre-set with the current address from the slow address counter. Thus, when the fast counter sequences through its counts starting at the current address from the slow counter, proceeding to the count of 256 and then back to 0 continuing to count up to one less than the current address, the entire one-second signal record stored in the memory block 104 is read out in time compressed fashion. For system considerations, only the middle half second of this data, i.e. 128 words, is read out every $2^{-8}$ seconds thus providing this data compressed in time by a factor of 128 relative to the input word rate of the memory block 104. It will be appreciated that this readout arrangement, as well as a wide variety of other readout arrangements, may be achieved by straightforward adjustment of the addressing counters.

It is thus appreciated that the memory block 104 and its associated addressing equipment (not shown for simplicity) provides the function of one-second signal record storage and time compression of 128:1. The memory block 104 thus functions as the signal deltic 21 previously described with regard to FIG. 3.

The 16-bit words read out from the memory block 104 in time compressed fashion are applied to a 32-bit buffer shift register 105 wherein the words are converted to a serial bit stream at a rate of $2^{19}$ bits per second. Thus, the output of the shift register 105 is a duplicate of the middle one-half second of the most recent one-second sequence of inputs to the shift register 103 but compressed in time by a factor of 128. The 32-bit shift register 105 has eight evenly spaced taps 106, each tap being separated from the next tap by four shift register stages. Thus the eight taps 106 of the shift register 105 provide eight time compressed duplicates, respectively, of the middle one-half second of the most recent second of inputs to the shift register 103 at a rate of $2^{19}$ bits per second, the duplicate from each tap being delayed by 4 bits with respect to the duplicate from the preceding tap.

In a manner similar to that described above with respect to FIG. 3, the multiplicative processor 100 of the present invention performs cross-correlation of the time compressed input signal with the down and upsweep replicas d and e, respectively, (FIG. 1) to obtain matched filter outputs with respect to these signals. In FIG. 3, the cross-correlation of the time compressed input signals with respect to the down and upsweep replicas were illustrated as performed in parallel in two matched filters 34 and 35, respectively. As previously described with respect to FIG. 3, each of the matched filters 34 and 35 included a multiplier responsive to its associated up or downsweep replica, and to the time compressed input signal. The integrated output of the multiplier provided the matched filter output signal. In the specific embodiment illustrated in FIG. 5, the upsweep and downsweep replicas are conveniently provided in digital form by the digital waveform generator of said U.S. Pat. No. 3,633,017 where each replica is quantized into 2,048 evenly spaced sample points, each point being provided as a 6-bit number by the waveform generator in the manner described in said U.S. Pat. No. 3,633,017. The matched filtering with respect to the upsweep and downsweep replicas are perfomed sequentially by repeating the time compressed input signal and sequentially providing the down and upsweep replicas utilizing the same matched filtering apparatus for both correlations. Since both the time compressed input signal and the up and downsweep replica waveforms are in quantized binary format, the multiplication and integration of the matched filters, as previously described with respect to FIG. 3, are performed in the embodiment illustrated in FIG. 5 by binary addition or subtraction and accumulation in a manner to be explained. Additionally, each of the downsweep and upsweep replicas is provided by the waveform generator of said U.S. Pat. No. 3,633,017 in complex form to perform complex cross-correlation for reasons well appreciated in the art. Accordingly, the waveform generator of said U.S. Pat. No. 3,633,017 simultaneously provides an in-phase and a quadrature version of each of the replicas in the binarily quantized format previously described. Alternatively, the input signal could be translated to a frequency band entered at zero frequency and stored as complex samples.

The multiplicative processor system 100 of the present invention requires sampling of the downsweep and upsweep matched filter outputs at a rate in excess of the signal bandwidth $W_s$. For the present embodiment where $W_S = 400$ hertz, the closest convenient binary sampling rate is 512 hertz or once for every eighth sample of the analog input signal at the input sampling rate of 4,096 hertz. This required matched filter sampling rate is doubled in the present embodiment to minimize sampling losses and then reduced from the rate of 1,024 hertz to 512 hertz by summing adjacent matched filter output sample pairs in order to accommodate the writing speed of the cathode ray tube display utilized. The computation of one sample of a matched filter output requires correlation of the 2,048-sample input signal record and, therefore, readout of the corresponding 128 words from the memory block 104, with the corresponding 2,048 samples of the reference function replica from the digital waveform generator of said U.S. Pat. No. 3,633,017. The sequential correlation with respect to the upsweep and downsweep matched filtering therefore requires a system time compression factor of 1,024 or eight times that previously designated. The eight taps 106 of the shift register 105 permit the time compression factor of 128 to be utilized providing the required matched filter output sample spacing of four input signal samples. Thus on every alternate readout of the 128 word time compressed input signal from the memory block 104 at a rate of 128 times per second, the 2,048 sample complex reference function for either the upsweep or the downsweep is correlated with the eight delayed versions of the input signal record provided by the eight taps 106 to generate eight samples of the corresponding matched filter output, i.e. every $2^{-7}$ seconds, eight matched filter output samples spaced by $2^{-10}$ seconds are computed. The matched filter samples with respect to the other waveform replica are computed during the intervening remaining input signal record readout intervals.

Referring still to FIG. 5, the eight taps 106 of the shift register 105 are connected in parallel to a real matched filter 107 and an imaginary matched filter 108 which together perform the complex correlation previously discussed. The real matched filter 107 also has an input connected to receive the in-phase up and downsweep replicas from the waveform generator of said U.S. Pat. No. 3,633,017 and the imaginary matched filter 108 has an input for receiving the quadrature up and downsweep replicas therefrom. Each of the matched filters 107 and 108 comprises eight conventional 16-bit serial accumulators connected respectively to the eight taps 106. Each of the accumulators of the real matched filter 107 is connected to receive the 6-bit samples of the inphase replicas from the waveform generator and the eight accumulators of the imaginary matched filter 108 are connected to receive the 6bit samples of the quadrature replicas therefrom.

As previously discussed, since the input signal is hard limited, the multiplication and integration required for the correlation process, as previously discussed with respect to FIG. 3, is accomplished by the accumulators. The instantaneous value of the binary digit at each of the eight taps 106 controls the associated real accumulator in the matched filter 107 and the associated imaginary accumulator in the matched filter 108 to either add or subtract the in-phase and quadrature 6-bit replica samples, respectively, into the respective accumulated totals stored therein. When the input signal bit is binary ZERO, representative of a positive amplitude, addition takes place and when the input sample is binary ONE, representative of a negative amplitude, subtraction takes place. Thus, for every alternate readout of the 128 word input signal record from the memory block 104, eight complex matched filter output samples spaced by $2^{-10}$ seconds are computed in the accumulators for, for example, the downsweep replica, and on the remaining alternate readouts of the memory block 104, the matched filter output samples are computed for the upsweep replica.

For the particular embodiment illustrated in FIG. 5, the time compressed input data from each of the eight taps 106 are applied to conventional complementing logic (not shown for simplicity) at the inputs of one of the real and one of the imaginary accumulators of the set of 16 serial accumulators. The serial inputs to eight of these accumulators (the real accumulator of each of the real and imaginary pairs) is the in-phase component of the complex replica from the waveform generator and the input to the other eight accumulators is the corresponding quadrature component as previously discussed. These replica components are quantized to 6 bits with a maximum value of ±22. The real time correlation interval of one-half second requires summation over $2^{11}$ samples producing a maximum total of less than $±2^{15}$ which is readily accommodated by the 16-bit accumulators. Thus during each readout of the input signal record or every $2^{-8}$ seconds, eight complex samples of the cross-correlation function of the hard limited input signal and the complex replicas are generated, these matched filter samples being displaced in time by four input samples or one millisecond at the 4,096 hertz sampling rate. The matched filtering logic is time shared between the downsweep and the upsweep replicas by suitable programming of the waveform generator of said U.S. Pat. No. 3,633,017.

After each repetition of the time compressed input signal record and the associated replica from the waveform generator, switchable connections 111 are effected between the accumulators of the matched filter 107 and the accumulators of the matched filter 108 such that the real accumulator and the imaginary accumulator associated with each tap 106 of the shift register 105 are serially connected in a manner that their respective stored totals are provided adjacent each other on a lead 112. All of the real and imaginary accumulator pairs of the matched filters 107 and 108 are similarly connected so that the in-phase and quadrature components of each sample are provided adjacent each other on the lead 112.

The 16-bit complex matched filter output sample pairs on the lead 112 are applied to a conventional magnitude computation circuit 113 wherein each 16-bit real and imaginary matched filter output is rounded to 8 bits and the absolute magnitude thereof computed. Such circuits are well known in the art and will not be described further for brevity.

As previously explained with respect to FIG. 3, the matched filter output samples are squared in circuits 36 and 37 and the multiplier 46 is utilized for the multiplicative processing thereof. In the embodiment illustrated in FIG. 5, these two multiplication functions are both performed by an 8-bit multiplier 114 time shared between the two functions by a double pole-double throw switch 115 and a single pole-double throw switch 116, all the wipers thereof being ganged together. When in the positions opposite those illustrated in FIG. 5, the switches 115 and 116 connect the multiplier 114 to provide the squaring function in a manner to be explained and when in the positions illustrated in FIG. 5, the switches 115 and 116 connect the multiplier 114 to perform the multiplicative processing function for the system. The positioning of the switches 115 and 116 are accomplished by a correlate interval signal derived from the timing and control circuits of the system which are omitted from FIG. 5 for simplicity.

Considering the switches 115 and 116 in the positions opposite that illustrated in FIG. 5, the 8-bit matched filter samples from the magnitude computation circuit 113 are applied to both the A and the B inputs of the multiplier 114 which therefore computes the squares thereof applying these quantities to the wiper of the switch 116. With the switches 115 and 116 positioned oppositely to that illustrated, the output of the multiplier 114 is applied to an accumulator 117 and a 16-bit 1-word buffer 118. The output of the multiplier 114 is applied to the accumulator 117 which sums the squared real and imaginary components of each matched filter sample to form a magnitude squared matched filter output sample. Adjacent pairs of these samples are then added to reduce the output sampling rate to 512 samples per second for each of the upsweep and downsweep matched filter functions and rounded to 8 bits. Since the scaling of the computations is set so that the maximum squared magnitude of a single matched filter sample is just less than $2^8$, this last summation of adjacent samples could, for high signal to noise ratios, produce values which exceed the accumulator 117 capacity by almost 2 to 1. Such values are limited by detecting the accumulator 117 overflow and setting the result to the maximum value of $(2^8 - 1)$ in order to retain good performance on low signal to noise ratio signals. Pairs of these 8-bit results, i.e. two of the 512 hertz matched filter output samples, are combined in the 1-word buffer 118 into a single 16-bit word and thereafter transferred into the next portion of the system via a single pole-double throw switch 121. The next two pairs of matched filter output samples are similarly processed in the accumulator and buffer 117, 118 and also transferred via the switch 121. The wiper of the switch 121 is controlled by an alternate correlation intervals signal to be in the position illustrated in FIG. 5 during every alternate correlation interval when the waveform generator is providing the downsweep waveform replica to the matched filters 107 and 108. The wiper of the switch 121 is similarly controlled to be in the position opposite to that illustrated during the remaining alternate correlation intervals when the waveform generator is providing the upsweep waveform replica to the matched filters 107 and 108.

One contact of the switch 121 is connected to a two-word buffer 122 for storing four 8-bit matched filter output samples provided by the accumulator and buffer 117 and 118 during the upsweep matched filter correlation intervals. The other contact of the switch 121 is connected to a memory block 123 for storing a 1-second record of the matched filter output samples provided during the downsweep matched filter correlation intervals. The memory block 123 is configured in a manner similar to that described above with respect to the memory block 104 to provide a deltic function. The memory block 123 may be conveniently included as part of the core memory of the digital waveform generator of said U.S. Pat. No. 3,633,017.

The embodiment of the invention illustrated in FIG. 5 computes $2^{10}$ complex samples per second of an upsweep and downsweep matched filter; converts these samples in pairs to magnitude squared samples at a rate of $2^9$ samples per second for each of the matched filter functions; scales and limits these results and formats two of the resulting 8-bit samples into a 16-bit word. These results are generated in groups of two words containing four matched filter magnitude squared outputs which result from eight complex matched filter outputs, every correlation interval of $2^{-8}$ seconds. The logic is time shared between the two matched filter functions on alternate correlation intervals so that four outputs for each matched filter function are produced every $2^{-7}$ seconds for an output rate of $2^9$ samples per second for each filter function. The switch 121 routes the output samples to the two-word buffer 122 during the alternate upsweep filter correlation intervals and to the memory block 123 on the intervening downsweep correlation intervals. A 1-second record, i.e. 256 words or 512 samples of the downsweep matched filter output, is stored in the memory block 123 for readout at a time compressed rate of 256:1. Each new input word to the memory block 123 replaces the oldest data word stored therein. At the end of each correlation interval, after the matched filter samples have been computed and stored, the switches 115 and 116 are thrown to the positions illustrated in FIG. 5 to perform the multiplicative portion of the receiver processing.

Every $2^9$ seconds, one of the 8-bit samples from the upsweep matched filter two-word buffer 122 is applied for a $2^{-9}$ second interval to the B input of the multiplier 114 via a switch 115. During this time 256 samples are read from the down-matched filter delay and time compressor storage memory block 123 beginning at the oldest sample within this group of samples and proceeding to the most recent sample within this group of samples. The down-matched filter samples from the memory block 123 are applied at a rate of one sample every $2^{-17}$ seconds, or approximately 8 microseconds, to the A input of the multiplier 114. Thus, onehalf second of the current 1-second record from the down-matched filter is multiplied by the current up-matched filter sample for the reasons given with respect to FIG. 3. This process is repeated every $2^{-9}$ second for each new upsweep matched filter output from the buffer 122. The data applied to the A input of the multiplier 114 corresponds to down-matched filter samples which have been delayed by ¼ second to ¾ seconds relative to the up-matched filter input at B. As readily appreciated from FIGS. 1 and 2, this one-half second interval corresponds to a doppler search of ± ¼ the signal bandwidth which is performed 512 times per second or once for every matched filter output.

The output of the multiplier 114 is applied to a threshold circuit 124 via the switch 116. The output of the multiplier 114 is compared in the threshold circuit 124 to an adjustable 16-bit number in a register 125. If the output of the multiplier 116 exceeds the 16-bit number, the threshold circuit 124 provides a binary ONE signal and if the output of the multiplier 116 does not exceed this number, the threshold circuit 124 provides a binary ZERO signal. The output of the threshold circuit 124 is applied as the Z-axis signal to the display as previously discussed with respect to FIG. 3. The 16-bit number in the register 125 may be adjusted for the purposes of display sensitivity. A blanking signal may be added to the Z-axis signal in a conventional manner for clarity of display.

The X-axis and Y-axis drive signals, previously discussed with respect to FIG. 3, position the beam of the display oscilloscope in synchronism with the Z-axis signal so as to present the processor output in a compensated time-frequency plane. The raster developed by the X and Y drive signals is similar to that previously described with respect to FIG. 4, except that the skew offset is adjusted to T/4 instead of the indicated T/2. The doppler frequency is displayed vertically with a full scale range approximately equal to ± ¼ of the signal bandwidth. This frequency range may be converted to approximate target speed in knots by the formula:

$$Z_{MAX} \cong \pm 400\ W_s/f_0$$

where $W_s$ is the bandwidth in hertz and $f_0$ is the center frequency in hertz.

It will be appreciated from the foregoing, that the magnitude computation circuits 113 and the multiplier 114 of FIG. 5 form the magnitude squared function of the blocks 36 and 37 of FIG. 3. It will also be appreciated that the memory block 123 of FIG. 5 performs the function of the multiplier deltic 42 of FIG. 3. Furthermore, the relative timing between the upsweep and downsweep channels may readily be adjusted by altering the addressing of the memory block 123. The timing signals such as the alternate correlation interval signal associated with the switch 121 and the correlate interval signal associated with switches 115 and 116 of FIG. 5 as well as the signals (not shown) for controlling the timing of the various blocks of FIG. 5 and as schematically illustrated in FIG. 3 by block 53, may readily be derived from the digital waveform generator circuitry of said U.S. Pat. No. 3,633,017. It will be appreciated that the switches 115, 116 and 121 are schematically illustrated and would preferably be instrumented by logic circuits in a manner well known in the art.

The above-described embodiment of the invention was explained in terms of generating parallel delayed input signals by means of the eight taps 106 of the shift register 105 and the eight complex correlators of 107 and 108. It will be appreciated that this parallel operation is not a requirement of the invention if the memory blocks and waveform replica generating circuitry are operated at eight times the speeds indicated above. If this arrangement is utilized, the shift register 105 with the eight taps 106 may be replaced by a single buffer register, and the eight parallel complex correlators 107 and 108 may be replaced by a single complex correlator.

As previously mentioned, a wide variety of relative timing arrangements may be instrumented with the present invention by adjusting the addressing of the memories. It is appreciated that the half-second waveform replicas d and e of FIG. 1 are merely illustrative and may be replaced by other arrangements. For example, the replicas as illustrated may be extended in time and hence in frequency by ± ¼ seconds to provide larger correlation output signals. Furthermore, different portions of the records stored in the memory blocks 104 and 123 may be utilized in instrumenting the invention. For example, the first half second of a record may be correlated against the downsweep replica and the second half second may be correlated against the upsweep replica. Such an arrangement would, of course, change the timing of the system and hence would require a display raster altered from that illustrated in FIG. 4. An alternative arrangement may be to provide a positive delay in one channel and a negative delay in the other channel incrementally varying the amount of delay, reversing the polarities thereof as required. In such a system, the raster scan may be provided vertically without any raster skew as described above. It will furthermore be appreciated that the signal deltic 21 and the multiplier deltic 42 of FIG. 3 and their equivalent components of FIG. 5 may be instrumented by shift register deltic arrangements of types well known in the art.

The embodiments of the present invention provide a multiplicative processor that eliminates range-doppler ambiguities in the same efficacious manner as that described in said Ser. No. 125,420, now U.S. Pat. No. 3,808,594, and U.S. Pat. No. 3,631,490, except with significantly greater equipment simplicity and a convenient display compared to these prior arrangements.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. In a system for detecting targets by transmitting a composite signal having first and second components and processing the composite signals reflected from said targets, the combination comprising
   input terminal means responsive to said reflected composite signals,
   first matched filter means having an input coupled to said input terminal means and matched to said first component of said reflected composite signals and having an output for providing first signals,
   second matched filter means having an input coupled to said input terminal means and matched to said second component of said reflected composite signals and having an output for providing second signals, time compression means having an input coupled to said output of said first matched filter means for storing said first signals occurring during a predetermined time interval, said time compression means having an output, and multiplier means having first and second inputs coupled to said output of said time compression means and to said output of said second matched filter means respectively and having an output for providing the product of said stored first signals and said second signals.

2. The system of claim 1 in which said time compression means comprises deltic means having an input coupled to said output of said first matched filter means and having an output coupled to said first input of said multiplier means.

3. The system of claim 1 further including display means coupled to said output of said multiplier means for providing a range-doppler display in accordance with said product.

4. In the system of claim 1 in which said composite signal comprises a doppler invariant *v-fm* waveform composed of first and second doppler invariant fm segments with said first and second matched filter means matched to said first and second doppler invariant fm segments, respectively.

5. In the system of claim 1 further including further time compression means having an input coupled to said input terminal means to receive said reflected composite signals for storing said reflected composite signals occurring during a predetermined time interval and having an output coupled to said inputs of said first and second matched filter means, and waveform generator means coupled to further inputs of said first and second matched filter means for providing first and second waveform replicas thereto of said first and second components, respectively, of said transmitted composite signal.

6. in the system of claim 5 in which said first and second matched filter means comprise first and second cross-correlation means having respective inputs coupled to said output of said further time compression means and having respective further inputs coupled to said waveform generator means to receive said first and second replica waveforms, respectively, for providing the cross-correlation functions between said stored reflected composite signals and said first and second waveform replicas, respectively.

7. The system of claim 5 in which said waveform generator means includes means coupled to said further inputs of said first and second matched filter means for providing said first and second waveform replicas in complex form thereto, respectively.

* * * * *